United States Patent [19]

Auracher et al.

[11] 4,089,583

[45] May 16, 1978

[54] METHOD FOR MAKING OUTPUT/INPUT COUPLER FOR MULTI-MODE GLASS FIBERS

[75] Inventors: Franz Auracher, Munich; Ralf Kersten, Rottach-Egern, both of Germany

[73] Assignee: Siemens Aktiengesellschaft, Berlin & Munich, Germany

[21] Appl. No.: 774,663

[22] Filed: Mar. 4, 1977

[30] Foreign Application Priority Data

Mar. 5, 1976 Germany .................. 2609143

[51] Int. Cl.² .................. G02B 5/16; G03B 37/00
[52] U.S. Cl. .................. 350/96.15; 65/3 A; 65/4 B; 65/102; 65/DIG. 7; 350/96.21
[58] Field of Search .................. 65/3 A, 4 B, DIG. 7; 350/96 C, 96 B, 16 H

[56] References Cited

U.S. PATENT DOCUMENTS

| | | | |
|---|---|---|---|
| 3,901,582 | 8/1975 | Milton | 350/96 C |
| 3,902,786 | 9/1975 | Browne | 350/96 C |
| 3,933,410 | 1/1976 | Milton | 65/DIG. 7 |
| 4,008,061 | 2/1977 | Ramsay | 65/4 B X |

FOREIGN PATENT DOCUMENTS 2,340,020   2/1975   Germany .................. 350/96 C

OTHER PUBLICATIONS

Optical Tapping Element for Multimode Fibers H. H. White Research Lab. of Siemens A.G. D-8000 Munich 70 Fed. Rep. Ger. 10 May 1976, pp. 559-562.

*Primary Examiner*—Robert L. Lindsay, Jr.
*Attorney, Agent, or Firm*—Hill, Gross, Simpson, Van Santen, Steadman, Chiara & Simpson

[57] ABSTRACT

An output/input coupler for multi-mode glass fibers characterized by a substrate and a main line having a square cross section disposed on the substrate and having at least one branch line extending on said substrate therefrom with the branch line having a rectangular cross section smaller than the cross section of the main line and having one surface coplanar with the surface of the main line. The branch line may have the same thickness as the main line with a reduced width or may have both a reduced thickness and width. In one embodiment, the branch line extends as an arc and may terminate in an end line which has a square cross section equal to the cross section of the main line and extends at an angle to the main line. In another embodiment, the branch line extends rectilinearly and may terminate in an end line which extends parallel to the main line and has a square cross section equal to the square cross section of the main line. The coupler may be formed by stamping the coupler from a sheet of material or by using a photolithographic process to form the coupler from a layer of photosensitive material. If the coupler has branch lines with a thickness less than the thickness of the main line, the photolithographic process includes developing a first layer or foil of photosensitive material to form part of the main line and the branch line and then developing a second applied layer to produce the remaining portion of the main line.

8 Claims, 6 Drawing Figures

METHOD FOR MAKING OUTPUT/INPUT COUPLER FOR MULTI-MODE GLASS FIBERS

BACKGROUND OF THE INVENTION

1. Field of the Invention

The present invention is directed to an output and input coupler for multi-mode glass fibers and the method of making the coupler.

2. Prior Art

In a glass fiber transmission system, it is often necessary to output couple a part of the optical power from a glass fiber at a specific point or to additionally input couple optical power into the glass fiber system. The output coupling of a part of the optical power of the system enables supplying a subscriber with a signal or to measure the signal level in the line. The input coupling enables a subscriber to feed a signal into the transmission lines.

Output and input couplers for groups of glass fibers are already known. Examples of these couplers are described in the following two publications: F. L. Thiel, "Topical Meeting on Optical Fiber Transmission", Jan. 7-9, 1975, Williamsburg, Va., U.S.A., Paper WE 1-1 and A. F. Milton, A. B. Lee, "Topical Meeting of Optical Fiber Transmission", January 7-9, 1975, Williamsburg, Va., U.S.A., Paper WE 2-1.

Another known type of glass fiber branch arrangement is a branching fiber core which is arranged within a common fiber cladding. This known branching arrangement could also be used as an output and input coupler. This known branch arrangement was produced by providing a profile having a branched core, and then drawing the profile to form the appropriate branched glass fibers. However, the production process to produce this type of branched glass fiber is relatively expensive.

SUMMARY OF THE INVENTION

The present invention is directed to providing output and/or input couplers which are simple to produce and which coupler also makes it possible to output couple a very small portion of the optical power of the system, for example only a few parts per hundred or per thousand.

To accomplish this aim, the invention is directed to a coupler for use with multi-mode glass fibers to couple-out and couple-in a light signal to the glass fibers with the coupler comprising a substrate, a main line having a square cross section disposed on the substrate, said main line having at least one integral branch line extending on said substrate therefrom, said branch line having a rectangular cross section smaller than the cross section of the main line and having one surface coplanar with the surface of the main line.

A common feature of the couplers of the present invention is that they exhibit a straight main line of a square cross section from which main line there extends in the form of either an arc or a straight line at least one branch having a cross section which is smaller than the cross section of the main line, and that a surface area of the main line and each branch line lies on a common plane. The branch line may have the same thickness as the main line with a smaller width or may have a smaller thickness than the thickness of the main line. In addition, the arcuate or curved branch line may terminate in an end line which has a square cross section of the same size as the main line and the end line extends at an angle to the main line. When the branch extends in rectilinear fashion from the main line, it may terminate in an end line which extends parallel to the main line and has a square cross section equal to the square cross section of the main line.

The couplers of the present invention may be produced from a thermoplastic material by embossing or stamping the material with a single stamp which has a shape corresponding to the configuration of the coupler. In addition the coupler may be produced in a photolithographic process from a layer of photosensitive material deposited on a substrate, exposing the material using a mask having the configuration of the main line and branch line of the coupler, and developing the exposed layer to produce the coupler. If the coupler has a branch line with a thickness less than the thickness of the main line, then the photolithographic method includes applying a second layer of photosensitive material on the developed first layer, exposing the second layer through a mask having a pattern corresponding to the main line, developing the second layer to complete the formation of the main line which is thicker than the branch line.

DESCRIPTION OF THE PREFERRED EMBODIMENTS

Figure 1:
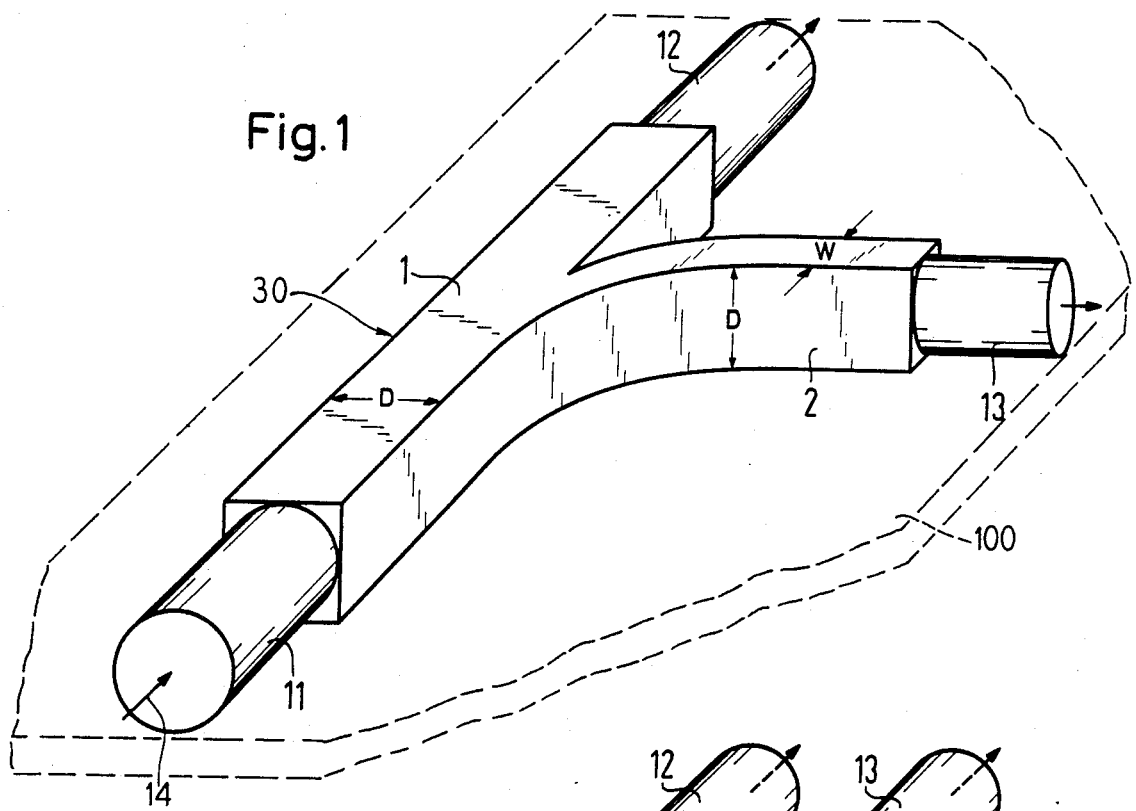
FIG. 1 is a perspective view with portions removed for purposes of illustration of a coupler in accordance with the present invention.

The principles of the present invention are particularly useful in a coupler generally indicated at 30 in FIG. 1. The coupler 30 has a main line 1, which has a square cross section with a width and height or thickness D. The main line 1 extends between a glass fiber 11 and glass fiber 12. A branch line 2 extends from the main line 1 in the form of an arc. The branch 2 has a rectangular cross section with a height D, which is equal to the height of the main line 1 and a width W, which is generally smaller than the width D of the main line 1. A glass fiber 13 is illustrated at the termination of the branch 2. Thus, when light propagating in the fiber 11 in a direction indicated by arrow 14, a portion of the light is coupled out through the branch 2 to the fiber 13.

Figure 2:
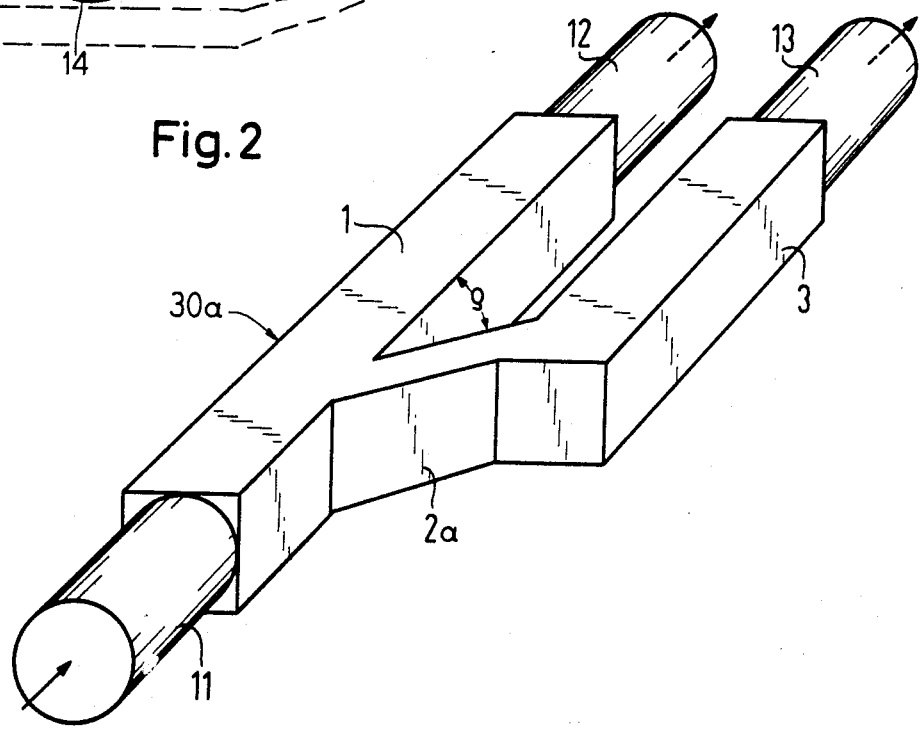
FIG. 2 is a perspective view of an embodiment of a coupler in accordance with the present invention with portions removed for purposes of illustration.

In the embodiment illustrated in FIG. 2, a coupler generally indicated at 30a has the main line 1 extending between the glass fibers 11 and 12 and has a square cross section of the width and height D. A branch line 2a extends from the main line 1 rectilinearly and terminates in an end line 3, which extends parallel to the main line 1 and possesses the same square cross section as the main line 1. As illustrated, the branch 2a extends in a straight line from the main line 1 at an angle $\rho$.

In each of the embodiments of FIGS. 1 and 2, the glass fibers 11, 12 and 13 have end faces abutting against the end faces of either the main lines 1, the branch line 2 or the end line 3. Reflection losses at these abutment points can be reduced by utilizing an immersion material between the abutting faces or by utilizing a non-reflecting coating on the abutting end faces. In each of the embodiments, light entering the coupling from the glass fiber 11 in the direction shown by the arrow 14 (FIG. 1) will have a portion coupled by the branch 2 or 2a into the fiber 13. If light were propagating in the fibers 11, 12 and 13 in the direction opposite to the direction indicated by the arrows in FIGS. 1 and 2, light would be coupled from the fiber 13 into the fiber 11 by the couplers either 30 or 30a.

In many cases, only a small quantity of the optical power is to be coupled out of the main line and in this case, the branch line 1 or 2a must possess a very small cross section, for example it must be extremely narrow in width. If D corresponds to the diameter of the glass fibers, such as 11, 12 and 13, and has a value of the order of 100 μm, then the branch lines such as 2 or 2a must posssess a width of less then 10 μm. In this case, the branch line 2 or 2a has a very small width in comparison to the height D.

The ratio of the power coupled out of the main line 1 by the branch to the power fed into the main line 1 through the glass fibers 11 is fundamentally dependent upon the ratio of the cross section of the main line 1 and the cross section of the branch lines 2 or 2a. When only a very small quantity of the power is to be coupled out of the line 1, it is expedient to provide branch lines having a very low height or thickness in addition to a very small width. The embodiments of FIGS. 3 and 4 illustrate output couplers of this type.

Figure 3:
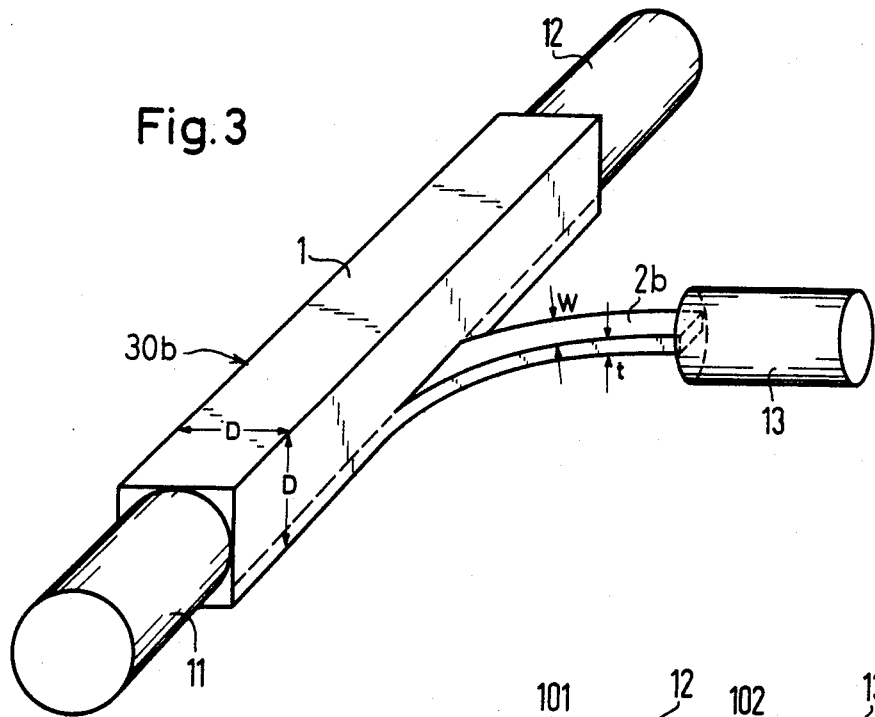
FIG. 3 is a perspective view of a second embodiment of a coupler in accordance with the present invention with portions removed for purposes of illustration.

In FIG. 3, an output coupler 30b has a main line 1, which has a square cross section with dimensions D, and a branch line 2b, which extends or leads away from the main line 1 in the form of an arc. As illustrated, the branch line 2b has a height or thickness t, which is less than the height or thickness D of the main line 1, and a width W, which is generally likewise less than the width D of the main line. It is noted that the coupler 30b, except for the difference of the dimensions of the branch 2b, is substantially similar to the coupler 30 of FIG. 1.

Although the coupler 30b illustrates the branch 2b to be extending and abutting with the end of the glass fiber 13, it may extend into an end line, which has the same height and width as the main line 1 but extends at an angle to the main line 1.

Figure 4:
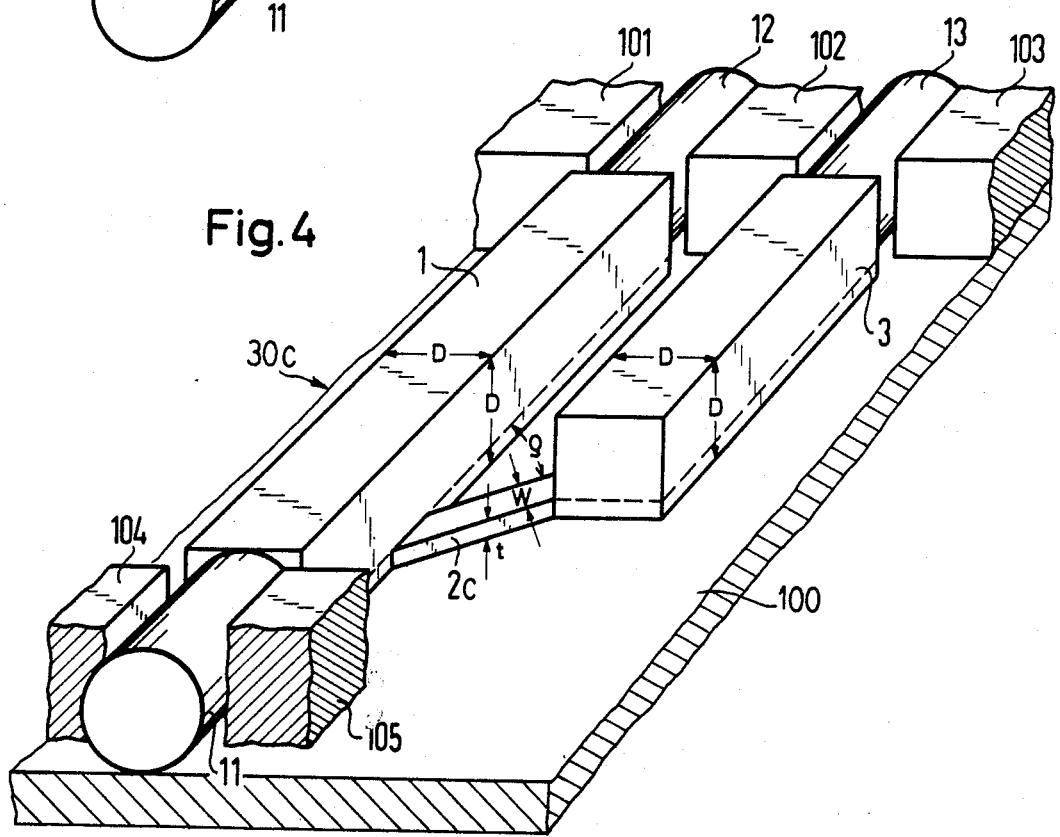
FIG. 4 is a perspective view of a third embodiment of the coupler of the present invention with portions broken away for purposes of illustration.

In FIG. 4, an embodiment of the coupler 30c has a straight branch line 2c which extends in a straight line at an angle ρ to the main line 1, which has a square cross section with a width and thickness D. As in the embodiment of the coupler 30a of FIG. 2, the branch line 2c terminates in an end line 3, which also has a square cross section with the dimensions D. The branch 2c possess a width W and a height or thickness t both of which are generally less than the dimensions D of the main line 1.

Figure 5:
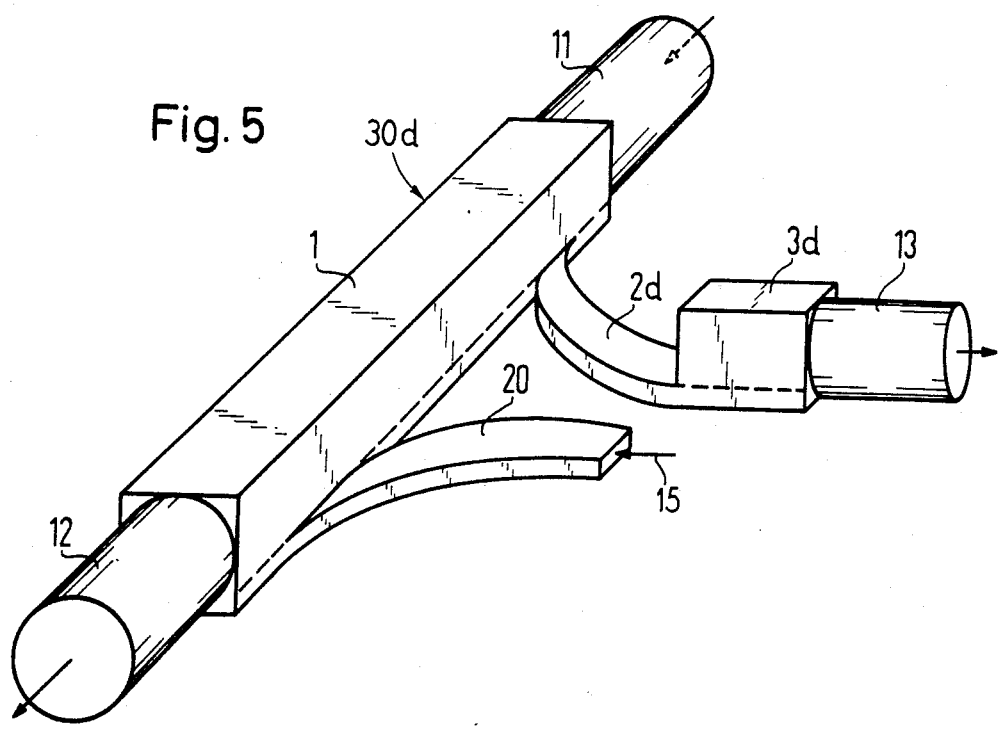
FIG. 5 is a perspective view of a fourth embodiment of the coupler in accordance with the present invention with portions removed for purposes of illustration.

In FIG. 5, an embodiment of the coupler, which has the combination for coupling-in and coupling-out, is generally indicated at 30d. In the coupler 30d, a branch line 2d will couple-out of a number of modes of light moving in a direction of the arrow in fiber 11. As illustrated, the branch line 2d extends to an end line 3d, which has substantially the same square cross-sectional dimensions as the main line 1. To couple-in light, a second branch line 20 will couple light traveling in the direction of the arrow 15 back into the main line 1. A light transmitter or generator, such as a laser diode (not illustrated), which provides an appropriate number of modes, may be coupled to the second branch line 20.

Figure 6:
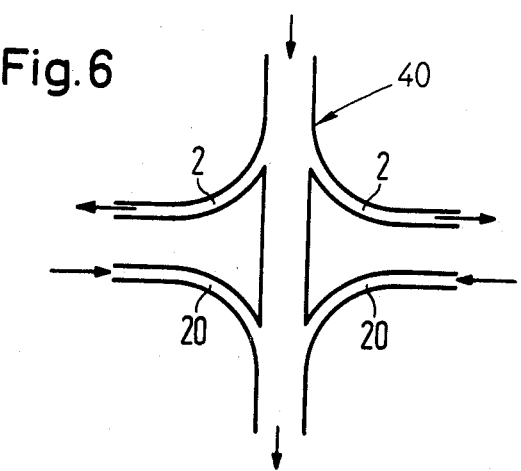
FIG. 6 is a schematic illustration of a coupler in accordance with the present invention.

As schematically illustrated in FIG. 6, a coupler which is generally indicated at 40, may be provided with a number of branch lines. As illustrated, the coupler 40 is provided with two branch lines 2 for output coupling of light and two branch lines 20 for input coupling of light. Other than the additional number of branch lines 2 and 20, the arrangement schematically illustrated in FIG. 6 is substantially similar to the coupler 30d of FIG. 5.

Each of the above embodiments of the coupler are arranged on a substrate such as the substrate 100 illustrated in broken lines in FIG. 1.

The following is an estimate of the dimensions for the above types of couplers. The light fed into the main line 1 through the glass fiber, such as 11, excite a light cone having an acceptance angle 2 θ in the main line 1. When the main line 1 has a height and width D, the main line will have a cross-sectional area $D^2$. The branch lines will have a height or thickness t, with $t \leq D$, and a width W, wherein $W \leq D$. The ratio n between the power coupled out by the branch line and the power fed into the main line by the incoming glass fiber 11 will depend on the shape of the branch line. When the branch line has a shape of an arc, such as branch line 2, $$n = Wt/D^2.$$

When the branch line is a rectilinear or straight branch line, such as 2a, $$n = Wt/4D^2 \text{ when } c < 2W \cos \theta \text{ and } \theta << \pi/2,$$

where c is the width of the interspace between main line 1 and end line 3 and angle ρ has a value $\rho = \theta$, i.e. this angle is precisely half of the opening angle of the cone of light fed into the main line through the incoming glass fiber. The above dimensions will result in a low loss output coupling.

If the couplers are used as input couplers, they do not readily operate in a loss-free fashion. Assuming that the main line 1 of the input coupler is connected to an incoming glass fiber having a cross section $A_1$ and an acceptance angle $\theta_1$, the branch line is connected to a second incoming glass fiber having a cross section $A_2$ and acceptance angle $\theta_2$, and the glass fiber, which leads away from the main line, has a cross section A and an acceptance angle $\theta_0$, the above dimensions must fulfill the following conditions.

$$A \sin^2 \theta_0 = A_1 \sin^2 \theta_1 + A_2 \sin^2 \theta_2.$$

Only when the above relationship is fulfilled one can obtain low loss coupling even under the condition that the mode spectra of the incoming glass fiber 13 and the main fiber 12 in FIGS. 1 to 4 are filled. This formula means that the number of modes capable of propagation in the outgoing glass fiber connected to the main line is equal to the sum of the modes excited in the two other glass fibers.

Since however, in a practical glass fiber system only one fiber-type of uniform cross section is to be used, the above condition cannot be fulfilled. However, a possibility of avoiding losses consists in that when the mode spectrum of the incoming glass fibers on the main line is not yet filled to the maximum number, light power can still be input coupled in a loss-free fashion through the branch lines until the maximum number of modes is reached.

If no greater number of modes are input coupled through the second branch 20 than are output coupled through the first branch 2d, the input/output coupler 30d (FIG. 5) advantageously operates without losses.

The couplers may be produced by several different methods. For example, the couplers may be stamped from a thermoplastic material, for example acrylic glass, by means of an appropriate shaped stamp. When producing the couplers 30b, 30c and 30d, the stamp will also emboss or deform the material so that the branch lines such as 2b, 2c and 2d, as well as 20 are provided with the desired thickness relative to the main line 1 and end lines 3 and 3d.

The couplers illustrated in the figures can also be produced by photolithographic processes. In such a process, a light sensitive synthetic foil, for example a photosensitive foil sold under the trade name Riston by DuPont Chemical Company, is exposed to UV light through a mask corresponding to the desired structure of the coupler. If the foil possesses the thickness D of the main line 1 of the coupler, couplers such as 30 and 30a (FIGS. 1 and 2) can be produced in one operating step. It should be noted that instead of utilizing a foil, a layer of photosensitive material (photoresist) having a thickness D can also be utilized.

To produce the coupler such as 30b, 30c and 30d (FIGS. 3, 4 and 5), two photolithographic operating steps are required. In the first step, a light sensitive foil or layer, whose thickness corresponds to the thickness to of the branch line such as 2b is applied on the substrate and is exposed to light through a mask so that after developement, a foil whose shape corresponds precisely to the outline of the desired coupler remains. After development of the first layer, a second light sensitive foil or layer is applied. The second light sensitive layer or synthetic foil has a thickness, which corresponds to the difference between the thickness D of the desired main line and the thickness t of the branch line. By utilizing a second mask, whose shape corresponds to the outline of the main line 1 either alone or together with the shape of the end lines 3 or 3d, the second light sensitive synthetic foil or layer is exposed to light so that after the second development, the main line, which has been reinforced in height or thickness and the end lines will remain. The mask for the second processing step must be accurately aligned relative to the previously produced layer component which have the outline of the entire coupler.

The second light sensitive foil can also be applied to a separate substrate and the reinforcement for the main lines and the end lines can be separately produced on this separate substrate by means of a corresponding mask. Thereafter, the two substrates must be accurately positioned to one another on their sides possessing the developed layers so that the reinforcement for the main lines and the end lines precisely meets the corresponding surface portions of the thinner layer component. The optical connection between the two synthetic layers can be further improved by either mechanical compression, heating or a combination thereof.

In glass fiber systems, the glass fibers are generally held in place in guide grooves on the substrate. These guide grooves can likewise be produced photolithographically by applying a light sensitive foil or layer on the substrate and then photolithographically producing the guide grooves in the foil or layer. The guide grooves can be formed using the same synthetic foil that was used for the production of the couplers. In FIG. 4, part of the synthetic foil from which the guide grooves are produced occupies positions 101-105 on the substrate 100. In the other figures, these guide grooves have not been shown in order to simplify the illustration of the coupling. Advantageously, both the output-input coupler and the guide grooves can be produced on the same substrate during the same operating processes.

Virtually any mechanical stable material can be used as the substrate 100. It is expedient to provide the substrate with a reflective coating or to use a substrate of a material, which possesses an index of refraction, which is definitely lower than the index of refraction of the material forming the output/input coupler.

Although various minor modifications may be suggested by those versed in the art, it should be understood that we wish to embody within the scope of the patent warranted hereon, all such modifications as reasonably and properly come within the scope of our contribution to the art.

We claim:

1. A coupler for use with multi-mode glass fibers to couple-out and couple-in a light signal to the glass fibers comprising a substrate, and a main line having a square cross section disposed on said substrate to extend between spaced ends of a pair of fibers disposed on the substrate, said main line having at least one integral branch line extending on said substrate therefrom, said branch line having a rectangular cross section smaller than the cross section of the main line and having one surface coplanar with a surface of the main line.

2. A coupler according to claim 1, wherein each branch line has a thickness considerably less than the thickness of the main line.

3. A coupler according to claim 1, wherein each branch line has a thickness and width which are considerably less than the thickness and width of the main line.

4. A coupler according to claim 1, wherein the branch line extends away in the form of an arc.

5. A coupler according to claim 4, wherein the branch line terminates in an end line which has a square cross section of the same size as the main line, said end line extending at an angle to the main line for connection to a third fiber.

6. A coupler according to claim 1, wherein the branch line extends away from the main line in a rectilinear fashion.

7. A coupler according to claim 6, wherein the branch line terminates on an end line, said end line having a square cross section equal to the square cross section of the main line, and said end line being arranged on the substrate to extend parallel to the main line for connection to a third fiber.

8. A coupler according to claim 1, wherein the branch line has a thickness equal to the thickness of the main line and a width substantially smaller than the width of the main line.

* * * * *